United States Patent
Williams et al.

(10) Patent No.: US 11,328,488 B2
(45) Date of Patent: May 10, 2022

(54) CONTENT GENERATION SYSTEM AND METHOD

(71) Applicant: Sony Interactive Entertainment Inc., Tokyo (JP)

(72) Inventors: Nigel John Williams, London (GB); Fabio Cappello, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/905,388

(22) Filed: Jun. 18, 2020

(65) Prior Publication Data

US 2020/0410767 A1 Dec. 31, 2020

(30) Foreign Application Priority Data

Jun. 28, 2019 (GB) ..................................... 1909319

(51) Int. Cl.
| | |
|---|---|
| *G06T 19/00* | (2011.01) |
| *H04N 13/111* | (2018.01) |
| *G06N 20/00* | (2019.01) |
| *G06F 3/01* | (2006.01) |

(52) U.S. Cl.
CPC ............ *G06T 19/006* (2013.01); *G06F 3/011* (2013.01); *G06N 20/00* (2019.01); *H04N 13/111* (2018.05)

(58) Field of Classification Search
None
See application file for complete search history.

(56) References Cited

U.S. PATENT DOCUMENTS

| | | | | |
|---|---|---|---|---|
| 2018/0096517 | A1* | 4/2018 | Mallinson | G02B 27/0093 |
| 2019/0250568 | A1* | 8/2019 | Li | G06N 3/08 |
| 2019/0337150 | A1* | 11/2019 | Parikh | B25J 9/161 |
| 2020/0035025 | A1* | 1/2020 | Crocker | G06T 19/006 |
| 2020/0184634 | A1* | 6/2020 | McLeod | G16H 30/40 |
| 2020/0218365 | A1* | 7/2020 | Todorov | G06F 3/011 |
| 2020/0312042 | A1* | 10/2020 | Sardari | G06T 17/00 |
| 2020/0356899 | A1* | 11/2020 | Rejeb Sfar | G06N 3/0454 |

(Continued)

FOREIGN PATENT DOCUMENTS

| | | |
|---|---|---|
| CN | 107610208 A | 1/2018 |
| CN | 109461205 A | 3/2019 |

(Continued)

OTHER PUBLICATIONS

Combined Search and Examination Report for corresponding GB Applicaiton No. GB1909319.4, 5 pages, dated Nov. 29, 2019.

(Continued)

*Primary Examiner* — Steven Z Elbinger
(74) *Attorney, Agent, or Firm* — Matthew B. Dernier, Esq.

(57) ABSTRACT

Methods and apparatus provide for generating content for display including one or more objects to be rendered, including: defining a plurality of virtual elements; setting one or more parameters associated with each of the plurality of virtual elements; and generating content for display using the plurality of virtual elements and corresponding parameter values, where setting the one or more parameters includes setting one or more parameters in accordance with the output of a machine learning algorithm adapted to determine appropriate parameters for the plurality of virtual elements so as to simulate an object to be rendered.

13 Claims, 9 Drawing Sheets

(56) References Cited

U.S. PATENT DOCUMENTS

2021/0043000 A1* 2/2021 Chen ............... G06T 17/20
2021/0121782 A1* 4/2021 Dossing ............ A63F 13/245

FOREIGN PATENT DOCUMENTS

| EP | 3296900 A1 | 3/2018 |
| GB | 2346788 A | 8/2000 |
| GB | 2543893 A | 5/2017 |

OTHER PUBLICATIONS

Y Furukawa, C Hernandez, Multi-View Stereo: A Tutorial. Foundations and Trends in Computer Graphics and Vision, vol. 9, No. 1-2, 40 pages, Jan. 2013.

* cited by examiner

CONTENT GENERATION SYSTEM AND METHOD

BACKGROUND OF THE INVENTION

Field of the Invention

This disclosure relates to a content generation system and method.

Description of the Prior Art

In recent years, driven at least in part by the improvements made in display technology, there has been an increase in the demand for interactive content that is able to offer an immersive experience to a user. For example, the increase in the number and quality of virtual reality (VR) and augmented reality (AR) devices lends itself to the provision of immersive experiences, while the development of televisions and other display devices that offer increased resolution, refresh rate, and colour reproduction (for example) also act as increasingly suitable devices for the provision of such content. In addition to this, advances in computing and graphics technology have contributed to the increase in suitable content that may be made available.

While video games may be provided that can offer such an experience, the approaches taken to provide viewer immersion in video games may not be applicable to captured video content such as movies or sports events. For example, when generating video game content it is common that the locations and properties of all objects in the environment are known and other features, such as lighting information, are also able to be calculated. Such information is often not available for captured video content, and therefore techniques applicable to video games to enable the provision of more immersive content are not considered to be widely applicable.

One example of captured video content that is adapted for increased immersion of a user is that of three-dimensional video. Consumer devices are available that are operable to display content that may be viewed (often aided by a corresponding set of glasses that are configured to enable the viewing of three-dimensional content) in a manner that causes the user to perceive the content as having significant depth despite the use of a two-dimensional display.

However, one drawback with such systems is that the viewpoint that is adopted by the user is often pre-defined (such as tied to the camera position in a movie) or severely limited (such as allowing a user to switch between a number of such pre-defined viewpoints).

This may serve to reduce the level of immersion that is experienced by the user when viewing the content, particularly in a VR context, as despite appearing three-dimensional there is no corresponding motion of the viewpoint as the user moves their head as would be expected were the user to move their head when viewing real-world content. The resulting disconnect between the viewpoint and the user's motion can lead to a sense of discomfort for the user, in addition to the loss of immersion.

Similarly, the restrictions placed upon the viewpoint location may be made more noticeable when a user is provided with more immersive content, as the user may be more inclined to try and explore the displayed environment. This can lead to the user attempting to relocate the viewpoint to a desired location in the virtual environment, and becoming frustrated when such a relocation is not possible within the constraints of the provided content. Examples of such changes in viewpoints include a user moving their head in a VR system in order to look around an environment, or an input using a controller or the like in a two-dimensional display arrangement.

It is in view of the above considerations that so-called free viewpoint systems have been developed. The object of such systems is to provide content which a user is able to navigate freely, such that a viewpoint may be selected freely (or at least substantially so) within a virtual environment and a corresponding view is able to be provided to a user. This can enable a user to navigate between any number of viewpoints within the virtual environment, and/or for multiple users to occupy corresponding preferred viewpoints within the virtual environment. These viewpoints may be distributed about an environment in a discreet fashion, or the changing of viewpoints may be a result of a continuous motion within the environment, or content may incorporate elements of each of these.

A number of challenges exist when seeking to provide high-quality image or video content with a free viewpoint. A number of such problems derive from the limitations of the content capturing systems that are used; for example, it may be difficult to capture sufficient image information due to occlusions, image resolution, and camera calibration or the like. In addition to this, information that may be required to generate additional viewpoints (such as lighting information, depth information, and/or information about occluded objects) may be difficult to derive based upon the captured image information. Similarly, limitations of the image capturing arrangement may lead to noisy data being obtained due to a lack of precision; such data may not be suitable for reproduction.

While a number of the problems associated with these issues can be mitigated by the inclusion of a greater number of cameras (or other sensors), this can be rather impractical in many cases. Similarly, addressing these issues by simply increasing the amount of processing that is applied can also be problematic, particularly when live content is being provided, as it may introduce an undesirable latency or require excessive computing power. It is therefore considered that alternative modifications to the free viewpoint content generating may be advantageous.

SUMMARY OF THE INVENTION

It is in the context of the above problems that the present disclosure arises.

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, a number of embodiments of the present disclosure are described.

A number of different approaches for implementing free viewpoint content are considered to be suitable, including photogrammetric, light field/multiscopic, and volumetric approaches. Of course, a number of other approaches (or combinations of the above) may be considered.

The first of these approaches comprises the manipulation of captured images in order to appear three-dimensional; this can add freedom to the viewpoint by enabling the user to peer 'around' an object in the image—this can often be rather limited in scope, but is suitable for a number of purposes. Reprojection of the captured image is often used in methods following this approach, enabling the simulation of the 'correct' view (that is, a view that appears to be from the correct position).

The second approach relies on the capturing of a number of images of the environment from different locations. A free viewpoint experience may then be provided to the user by using interpolation between the captured images; the user is able to manipulate the viewpoint freely within the bounds of the image capture area (that is, the area or volume bounded by the image capture devices).

The third approach that is considered, which is the approach in the context of which the present application is provided, comprises the generation of a virtual scene representing the imaged volume in the content capture process. This may include identifying the geometry of the volume and the objects within it, as well as determining any other parameters (such as lighting effects) as appropriate. Such an approach is discussed in 'Multi-View Stereo: A Tutorial' (Y Furukawa, C Hernandez, Foundations and Trends in Computer Graphics and Vision, Vol 9, No. 1-2, 2013), the contents of which are incorporated by reference.

While the present application is framed within the context of the volumetric approach to free viewpoint content, it is considered that the techniques discussed within may be applicable to one or more other approaches.

Figure 1:
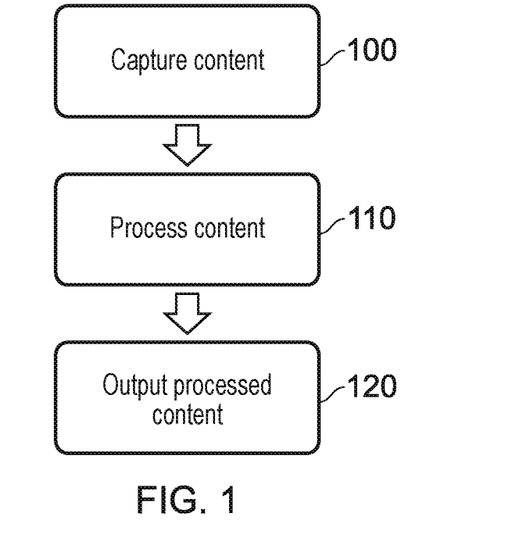
FIG. 1 schematically illustrates a free viewpoint generation and output method.

FIG. 1 schematically illustrates a method for capturing and generating free viewpoint content, in line with the third approach described above.

A step 100 comprises capturing the content. The content capturing process includes the use of image sensors, such as cameras, and may further include the use of microphones or the like for capturing audio. While in some cases the captured image content may be entirely two-dimensional, in other cases the content capturing process includes the capturing of depth information for a scene—this can be achieved using stereoscopic or depth cameras, for example, or any other method for determining the distance to an object in the capture environment. Examples of content capturing arrangements are described below with reference to FIGS. 2 and 3.

A step 110 comprises performing processing on the captured content, with the aim of generating content that a user is able to use to explore the captured environment with the aid of a free viewpoint. Examples of processing include the estimating of the depth of objects within the captured images, and the encoding of the processed data into a suitable format for storage and/or output to a viewer. Each of these is discussed below with reference to FIG. 5.

The processed data comprises a three-dimensional representation of the environment for which the content capture is performed (or is sufficiently complete so as to enable the generation of such a representation). This representation may be able to be distributed to a user to enable them to generate free viewpoint experiences locally, or it may be able to be used (for example, at a server) to generate image frames in accordance with a viewpoint defined by a client device.

A step 120 comprises the output of the free viewpoint content to a viewer. This may be performed in a number of different ways; for example, the viewer may request a particular viewpoint from a server which holds the encoded data. The server may then generate images representing the viewpoint at the requested position, and transmit this to the viewer. In some embodiments, the viewer may instead be provided with encoded data for the whole (or at least a part of) the captured environment such that processing for generating image content is performed locally.

Figure 2:
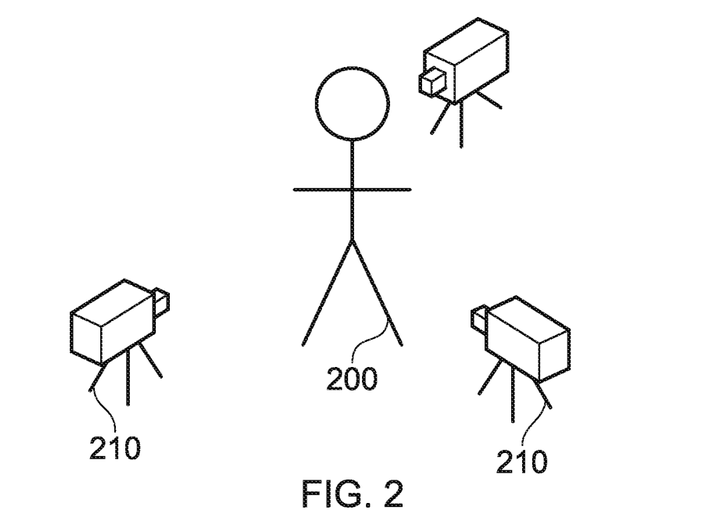
FIG. 2 schematically illustrates a content capture arrangement.

FIG. 2 schematically illustrates a content capture arrangement that may be used to implement step 100 as described with reference to FIG. 1.

In this Figure, a plurality of cameras 210 are arranged so as to capture images of a person 200 (such as an actor in a movie) from a range of different angles. The cameras 210 may also be configured to capture audio in the environment, although this may instead be captured separately. In some embodiments it is advantageous to be able to synchronise the cameras or establish the timing offset between their image capture—this may assist with generating a high-quality output for a user.

Between them, the cameras 210 may be arranged so as to be able to capture images of a significant proportion of the environment and objects within the environment. In an ideal scenario every part of every surface within the environment is imaged by the arrangement of cameras, although in practice this is rarely possible due to factors such as occlusions by other objects in the environment. Such an issue may be addressed in a number of manners, a selection of which is discussed below.

For example, the arrangement of cameras 210 as shown in FIG. 2 may be suitable for capturing images of the user from a number of angles—but the side of the person 200 facing away from the cameras may not be well-imaged, leading to a lack of information for this area. A number of techniques may be used to mitigate this problem, some of which will be discussed below.

Figure 3:
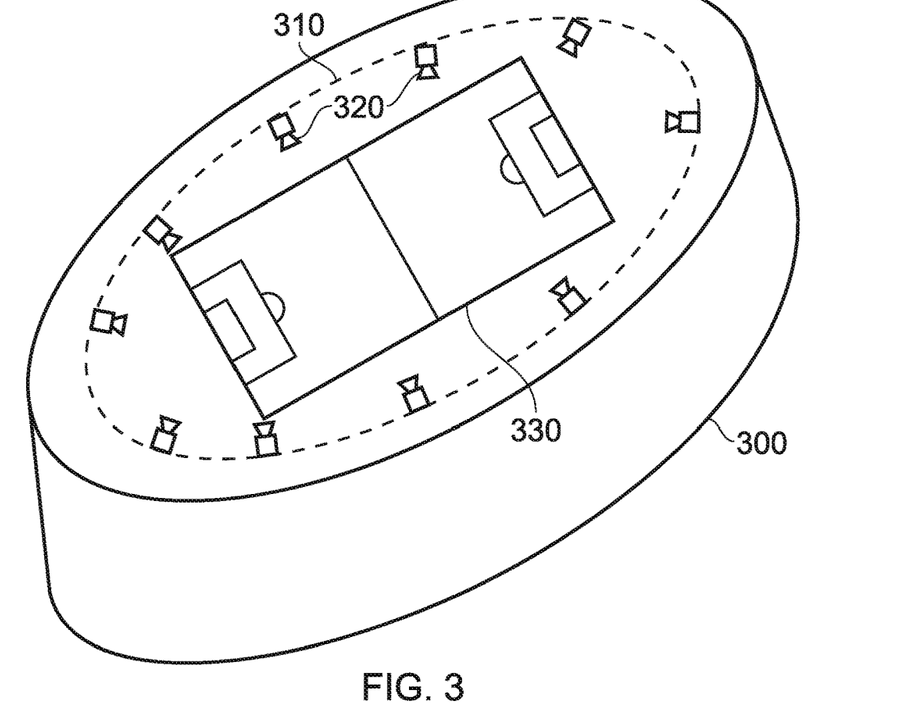
FIG. 3 schematically illustrates an alternative content capture arrangement.

FIG. 3 schematically illustrates an alternative content capture arrangement that may be used to implement step 100 as described with reference to FIG. 1. As is apparent from FIG. 3, this is a configuration that may be more suited for the capturing of large-scale events, such as sports matches, rather than individual people—although of course such an arrangement could be scaled down to an environment smaller than a sports stadium as appropriate.

FIG. 3 comprises a stadium 300 which has a fixture 310 that substantially follows the shape of the stadium 300. A plurality of cameras 320 are supplied on this fixture 310, and may be angled so as to capture images of events within the stadium 300; this may include the action on the pitch 330, the sidelines, or even the crowd. The number of cameras, and the properties of each camera, may be selected freely in order to provide a suitable degree of optical coverage of the environment. For example, a set of 40 cameras each with 4K resolution and arranged so as to be able to collectively image the whole pitch 330 may be provided.

Figure 4A:
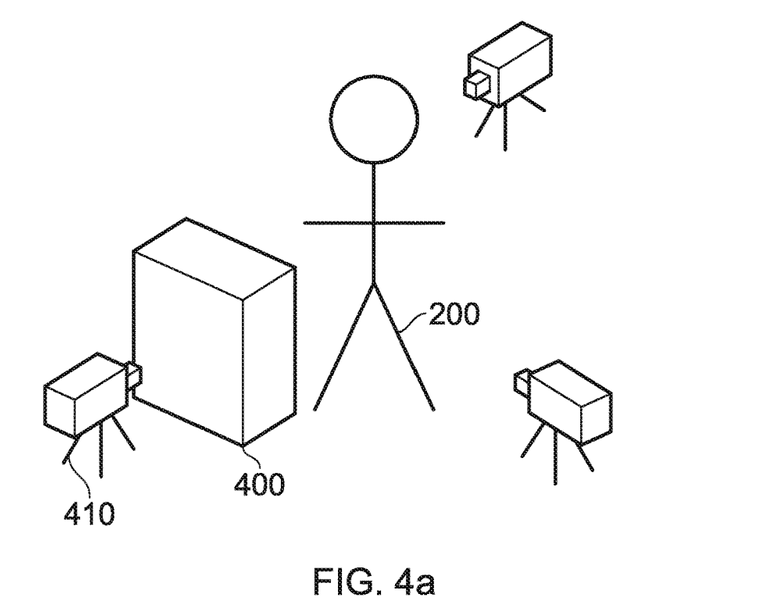
FIGS. 4a and 4b schematically illustrate an occluded content capture arrangement.
Figure 4B:
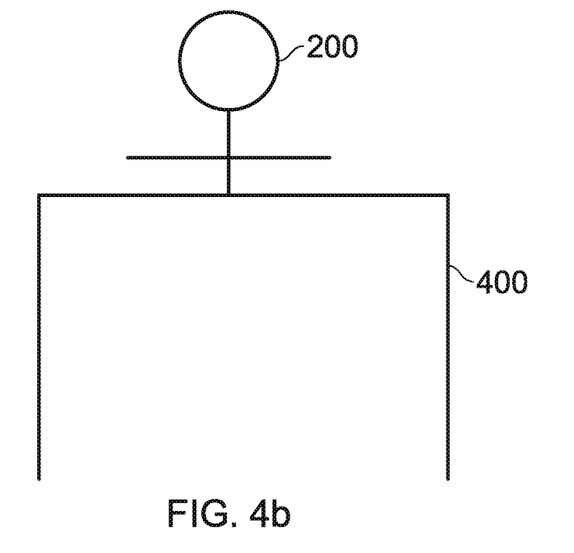

FIGS. 4a and 4b schematically illustrate an occlusion problem that may arise when capturing content in line with step 100 of FIG. 1.

FIG. 4a schematically illustrates an occluded content capture arrangement; this is the content capture arrangement of FIG. 2, with an additional object 400 in the capture environment that prevent the camera 410 from correctly imaging the person 200. Of course, while shown as an inanimate object the object 400 could be anything that blocks the camera's view—such as other people, cameras, or even inclement weather.

FIG. 4b schematically illustrates a viewpoint from the camera 410 of FIG. 4a. It is apparent from this Figure that the camera is no longer able to capture images of the lower half of the person's 200 body due to the occlusion by the object 400. This may lead to incomplete information about this area of the environment, which can cause problems in a free viewpoint arrangement—if a user moves the viewpoint to the other side of the object 400 there would not be sufficient information to generate a view of the person 200.

In some cases, the camera system for capturing images of the environment may be robust to such occlusions—for example, given enough cameras it is possible that the arrangement leads to every part of the environment (or at least a sufficient number of parts of the environment) being imaged by more than one camera. In such a case, it is possible that images of an area occluded from one camera's view are captured by another camera.

Alternatively, or in addition, a number of processing techniques may be used to fill such gaps. For instance, information about that area (such as the colour of the trousers worn by the person 200) may be stored from previously captured frames, or determined in dependence upon other information—for example, it may be assumed that the colour is constant (either over time, spatially, or both), and so any image of the trousers may be enough to supply the colour information despite being captured at a different time, and/or imaging a different portion of the trousers. Similarly, the colour could be input by an operator or the like.

Figure 5:
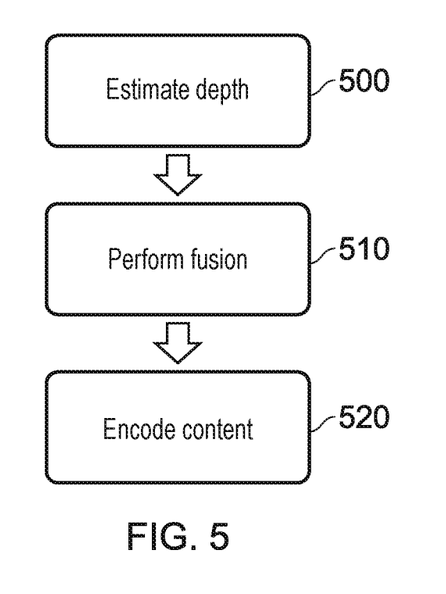
FIG. 5 schematically illustrates a content processing method.

FIG. 5 schematically illustrates a content processing method, which may be implemented as an example of the processing performed in step 110 of FIG. 1. Of course, any suitable processing may be performed in the step 110; it is not limited to that shown in FIG. 5, nor must every step of FIG. 5 be performed.

A step 500 comprises an estimation of the depth of one or more parts of the environment that is imaged. In some cases, this may be performed by identifying the disparity associated with an object between a pair of stereoscopic images; in other cases, monoscopic depth detection may be performed, or a position may be estimated from a number of images based upon knowledge about the position and orientation of the cameras used to capture those images.

A step 510 comprises the fusion of image data. Fusion of image data is the process of combining the information that is obtainable from each of a plurality of images in order to generate a three-dimensional space using images in a two-dimensional space. For example, image data may be fused so as to generate a three-dimensional model of an object that comprises two-dimensional information about each side of the object, as imaged by a corresponding plurality of cameras. This is discussed below in more detail, with reference to FIGS. 6 and 7.

A step 520 comprises the encoding of the processed image data, for example to generate data that is in a format that is suitable for storage and/or transmission to a user. Examples of suitable representations of the content include the use of point clouds and/or meshes to represent objects and features in the environment. For instance, a point cloud may be defined that describes the location of points on the surface of each of a number of objects/environmental features. When rendering an image, a viewpoint within the virtual environment may be defined and the point cloud is consulted to determine which objects (points) fall within the viewing frustum—once this is determined, corresponding texture information may be applied to generate a view within the virtual environment.

Further processing may also be performed in addition to, or instead of, one or more of the steps shown in FIG. 5. For example, segmentation may be performed so as to determine which elements of a captured image correspond to distinct objects and which elements form the background. Hole-filling or completion processing may also be performed, which is processing that seeks to identify where information about the environment is missing and to approximate information that may be desired, but is not present in the captured information.

As discussed with reference to step 510, fusion of image data may be performed in order to generate a more complete description of the environment in which image capture is performed. For example, image data from a second camera may be used to supplement the image data from a first camera, which can mitigate the problem of occlusion.

In general, fusion techniques utilise a number of captured images that each capture an image (a two-dimensional image and depth information) of the environment, the images being captured at different times or from different camera positions. These images are then processed to extract information to enable a three-dimensional reconstruction. An example of such a process is discussed below.

At a first stage, segmentation is performed. This process results in a separation of an imaged object and a background of the image from one another, such that the background may be removed from the image. The segmented image of the object, in conjunction with the depth data that is captured, can then be used to generate a three-dimensional image of the object from one side, where every pixel of the image represents a point in three-dimensional space.

By generating multiple such images from a number of viewpoints, three-dimensional images may be generated for an object from a number of different sides; this can enable the construction of a full three-dimensional volume representing the external shape of the object. The fusion process here is used to correlate matching points as captured by the different cameras, and to remove any erroneous points, so as to enable a combination of the captured three-dimensional images into a three-dimensional representation.

Figure 6:
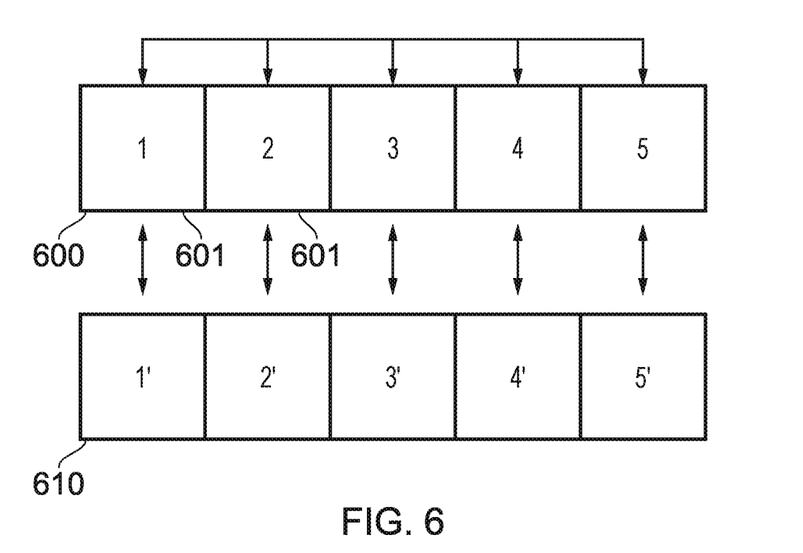
FIG. 6 schematically illustrates image fusion schemes.

FIG. 6 schematically illustrates examples of such fusion. A first image data set 600 and a second image data set 610 are shown, which correspond respectively to image data captured by a first and a second camera. Each of the image data sets comprises a number of consecutive frames 601.

Temporal fusion is a fusion technique that may be performed within a single image data set (that is, an image data set captured by a single camera over a time duration). In FIG. 6, this is shown with respect to the image data set 600, wherein information from the frames 601 (labelled 1-5) may each be used to supplement data from the other frames. Temporal fusion may be advantageous when there is motion of objects within the environment; occlusions may vary between the image frames captured by a single camera, and therefore image data from earlier- or later-captured frames may be suitable to fill gaps (such as those due to occlusion) in the data for a given image frame.

Spatial fusion may be performed between the two image data sets 601 and 610 (that is, image data sets captured by cameras located at different viewpoints); for example, image data from the frame labelled 1' may be used to supplement the image data derived from the frame labelled 1. This may be performed for any pairing of image frames, rather than necessarily being limited to those captured at (at least substantially) the same time. Spatial fusion is advantageous in that the image data from each of the image data sets is obtained from a different position—different views of the same object may therefore be captured.

Figure 7:
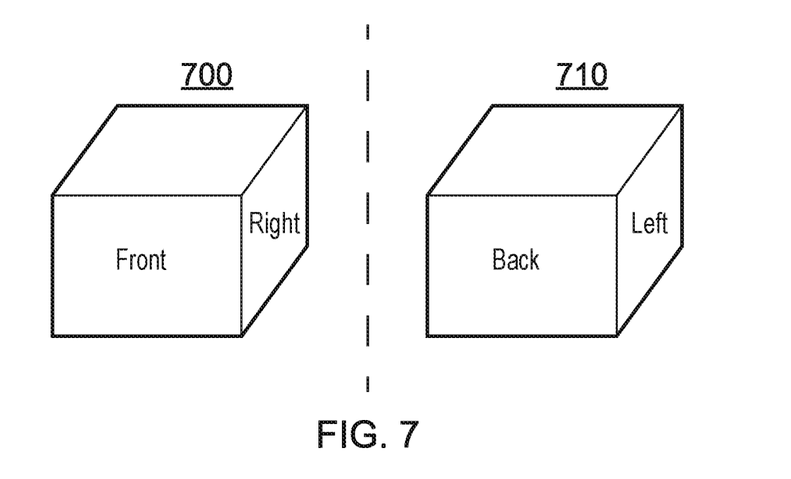
FIG. 7 schematically illustrates image frames for performing image fusion.

FIG. 7 schematically illustrates an example of two image frames 601, each imaging the same object. In the first, labelled 700, the front, top, and right portions of the object can be seen by an image capture device. In the context of FIG. 6, the image 700 may correspond to the image frame labelled 1 in the image data set 600.

In the second, labelled 710, the back, left, and top portions of the object can be seen by an image capture device. In the context of FIG. 6, the image 710 may correspond to the image frame labelled 1' in the image data set 610. This view would therefore represent a view of the object as captured by a different image capture device that is provided at a different location. Alternatively, the image 710 may correspond to the image frame labelled 5 in the image data set 600. This view would therefore represent a view of the object as captured by the same image capture device but at a later time, this time difference being sufficiently long that the object has rotated (or the camera has moved).

In either case, the data from each of the images 700 and 710 may be combined so as to generate a more complete description of the imaged object than would be available using only a single image frame comprising the object. Of course, any suitable combination of spatial and temporal fusion may be used as appropriate—the fusion process should not be limited to the specific examples provided above.

It should be appreciated that the segmentation-based approach used in the example above is non-limiting; other methods may be suitable. For example, a truncated signed distance function (TSDF) may be used to represent a scene volumetrically, with this representation being used for integrating multiple images of the scene captured from different viewpoints.

At the conclusion of the method described with reference to FIG. 5 (or an equivalent processing of the captured data), it is anticipated that the captured content has been converted into a form that enables the generation of a viewpoint at any (or at least at a substantial number of) locations within the captured environment.

Figure 8:
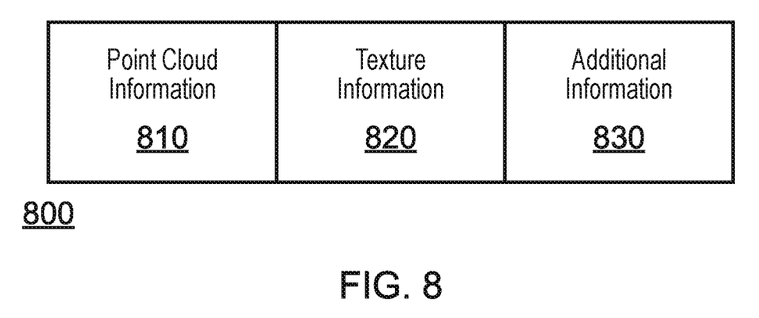
FIG. 8 schematically illustrates a data structure.

FIG. 8 schematically illustrates an exemplary data structure for the storage of the generated content; the stored generated content may be referred to as free viewpoint data. In this data format, a file 800 comprises point cloud information 810, texture information 820, and additional information 830. Of course, an alternative data structure may be provided, as is appropriate for the format of the generated content.

The point cloud information 810 may comprise sufficient data to enable to reproduction of the entire virtual environment, or at least a portion of that environment. For example, a different set of point cloud information 810 may instead be generated for each of a plurality of areas within the virtual environment—such as on a per-room basis.

The texture information 820 complements the point cloud information 810, such that textures are provided that correspond to each of the surfaces that are able to be described using the point cloud information 810. As noted above, the texture information is applied to the geometry described by the point cloud within a viewing region (defined by the viewpoint within the virtual environment) as a part of the rendering process. The textures can be stored in any suitable image format, for example.

The additional information 830 may comprise identifying information for the data structure (such as identifying the virtual environment that is represented by the included data). Alternatively, or in addition, information assisting with the reproduction of a virtual viewpoint within the virtual environment described by the point cloud information 810 may be provided; examples include lighting information for the environment. Any other suitable information may also be included as appropriate, such as object identification information or sound source information for the virtual environment.

As noted above, this information may be provided to the user in a raw form including data (such as a point cloud representation of the environment, in addition to texture and lighting information) for the whole of the environment. However, this represents a significant amount of data to transmit and store (point clouds may comprise millions or even billions of data points) and may therefore be inappropriate in a number of scenarios.

As an alternative, this information may be provided to a viewer by generating an image at a server in response to an input viewpoint position/orientation. While this may introduce an increased degree of input latency, it may be responsive enough to provide a suitable free viewpoint experience to a user.

In either case, rendering of a viewpoint must be performed based upon the encoded data. For example, when using a point cloud representation to store information about the captured environment the rendering process comprises a surface reconstruction process as a part of generating an image for display. This is performed so as to enable to generation of surfaces from a set of discrete points in the point cloud.

Figure 9:
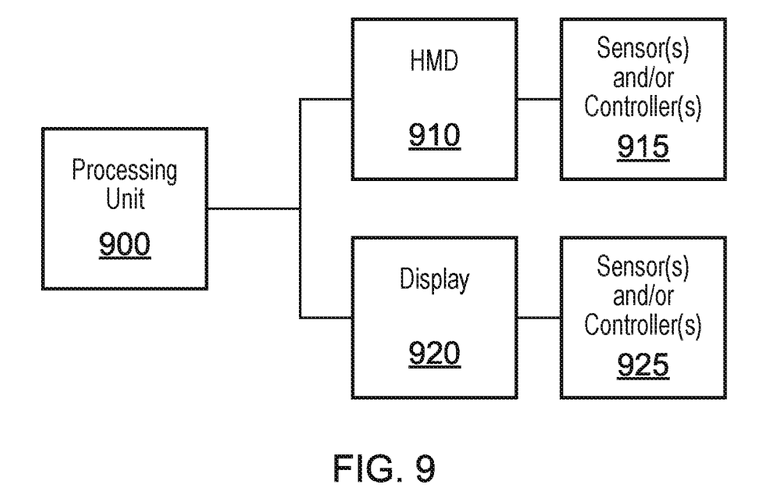
FIG. 9 schematically illustrates a content generation and display system.

FIG. 9 schematically illustrates a content generation and reproduction system. This system includes a processing unit 900, an HMD 910, and a display 920.

Figure 10:
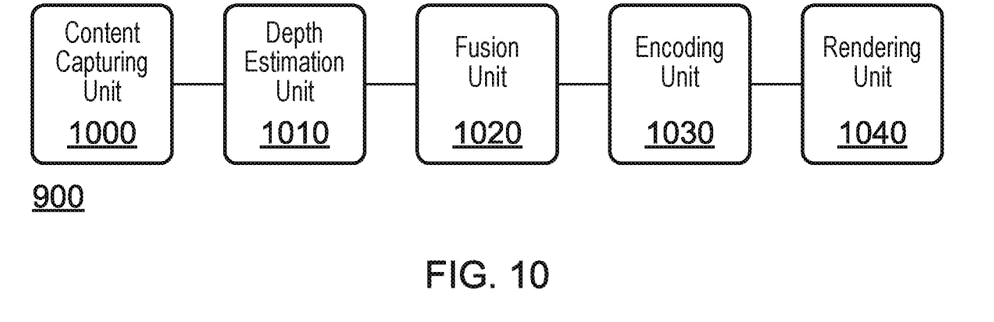
FIG. 10 schematically illustrates a processing unit.

The processing unit 900 is operable to generate content (for example, by using the method discussed with reference to FIG. 1), and to render a desired viewpoint for display to each of one or more users within the generated content. An exemplary arrangement of units within the processing unit 900 is shown in FIG. 10 and discussed below.

The desired viewpoint may be determined in any of a number of ways; for example, the HMD 910 may be associated with one or more position and/or orientation sensors 915 that enable the user's head motion (or any other suitable motion) to be used as an input to control the motion of the desired viewpoint. Alternatively, or in addition, the viewpoint may be controlled via inputs to a controller 915. Similarly, inputs to control the viewpoint may be provided via a control pad (such as a game controller) that is associated with one or more of the displays 910 (via the controller 915) and 920 (via the controller 925) and/or the processing unit 900.

In any case, the viewpoint may be controlled in a three-dimensional manner such that the user can move the viewpoint freely (or at least substantially freely) within the virtual environment, as well as modify the orientation of the viewpoint within the virtual environment defined by the free viewpoint data.

The HMD 910 and display 920 (such as a television, mobile phone or computer monitor) are operable to display content rendered by the processing unit 900. Each of these may be used independently, such that the other device does not display content at all, or in combination; for example, the displays may show the same content (with one of the display devices acting as a spectator screen, for example) or may show different viewpoints within the same virtual environment. Of course, the number of displays (head-mountable or otherwise) may be selected freely, rather than being limited to one of each type of display.

FIG. 10 schematically illustrates the processing unit 900, as described above with reference to FIG. 9. The processing unit 900 comprises a content capturing unit 1000, a depth estimation unit 1010, a fusion unit 1020, an encoding unit 1030, and a rendering unit 1040.

The content capturing unit 1000 is operable to control the content capture process; for example, this may comprise the control of one or more imaging units and/or audio capture units to generate information about a real environment. Such a process is described above with reference to step 100 of FIG. 1.

The depth estimation unit 1010 is operable to perform a process to generate estimates of the depth of one or more parts of the environment of which images are captured. This may comprise the use of any suitable depth estimation technique, and may use information about the locations of the content capturing devices. For example, this may comprise identifying the disparity between stereoscopic image pairs for an imaged feature. A depth estimation process is described above with reference to step 500 of FIG. 5.

The fusion unit 1020 is operable to perform an image fusion process so as to enable the generation of a coherent virtual representation of the real environment. This may include the generation of three-dimensional representations of imaged objects/features within the real environment. A fusion process is described above with reference to step 510 of FIG. 5.

The encoding unit 1030 is operable to generate data that is in a format that is suitable for the generation of images for display to a user, where those images may be generated for any viewpoint within the virtual environment. In some embodiments, the selected encoding method may be selected in dependence upon the desired transmission/storage methods. For example, if the encoded content is to be transmitted (such as to a separate rendering device via a network) the encoding method may be selected so as to either increase compression or reduce individual file size (such that files can be sent on an as-required basis). A content encoding process is described above with reference to step 520 of FIG. 5.

The rendering unit 1040 is operable to render images of the virtual environment for output to one or more displays (such as the HMD 910 and/or display 920 of FIG. 9). For example, the rendering process may comprise receiving a desired viewpoint (which may be determined based upon user inputs), identifying the regions of the point cloud that appear within the frustum defined by the desired viewpoint, and applying the corresponding textures to those point cloud regions.

In some embodiments, the processing unit 900 is instead not operable to generate the content, but is operable only to reproduce the content for display. For example, the content may be generated elsewhere and information (such as in the form of a file as discussed with reference to FIG. 8) may be provided to the processing unit 900 to enable a desired viewpoint to be rendered upon request for output to one or more display devices 910 and 920.

Of course, in some embodiments it is envisaged that the processing unit 900 may simply act as an intermediate device for accessing content from a server and providing it to the one or more displays 910 and 920. For example, rendered content could be provided to the processing device 900 by a server in response to uploaded information about a requested viewpoint; such content may then be transmitted to one or more displays 910 and 920. Similarly, the processing unit 900 may be omitted altogether in embodiments in which the HMD 910 and/or display 920 are able to communicate with the server directly.

Figure 11:
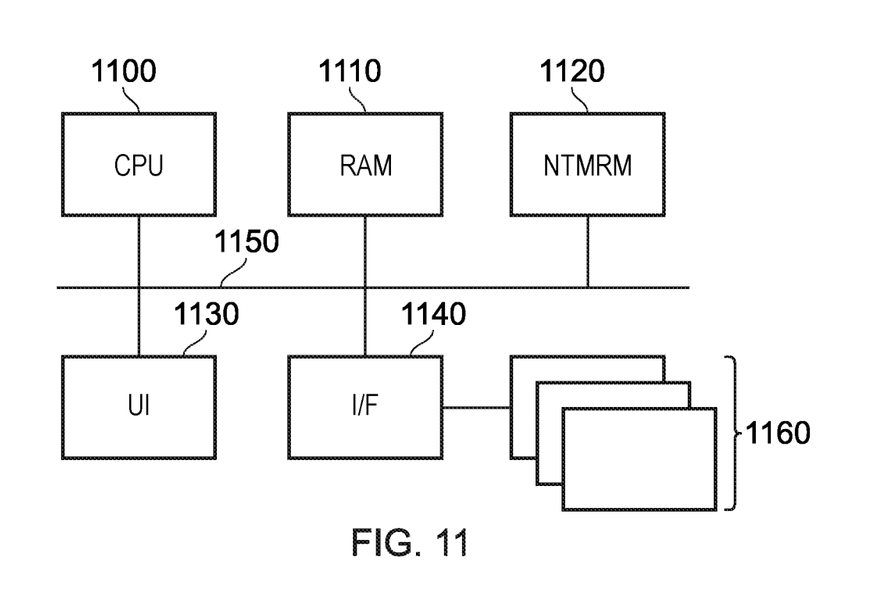
FIG. 11 schematically illustrates a data processing apparatus.

FIG. 11 schematically illustrates a data processing apparatus suitable to carry out the methods discussed above and in particular to implement one or both of the free viewpoint data generation technique(s) and the image viewing or presentation technique(s) outlined above, comprising a central processing unit or CPU 1100, a random access memory (RAM) 1110, a non-transitory machine-readable memory or medium (NTMRM) 1120 such as a flash memory, a hard disc drive or the like, a user interface such as a display, keyboard, mouse, or the like 1130, and an input/output interface 1140 linked to peripherals 1160 such as a camera, a display and a position and/or orientation and/or motion detector by which a current viewpoint (in a display mode) may be controlled. These components are linked together by a bus structure 1150. The CPU 1100 can perform any of the above methods under the control of program instructions stored in the RAM 1110 and/or the NTMRM 1120. The NTMRM 1120 therefore provides an example of a non-transitory machine-readable medium which stores computer software by which the CPU 1100 performs the method or methods discussed above.

When generating free viewpoint content, some objects may provide greater difficulties than others. For example, objects such as fires or waterfalls may be difficult to correctly image and reproduce for many reasons. For example, due to the complexity of these objects (in that they can be considered to be formed of a number of particles that do not have well-defined relationships, unlike in solid objects)

rendering techniques such as those used for meshes are often insufficient (or at least inefficient) for generating a realistic representation. This can also lead to issues when reproducing images of these objects for display.

Traditionally objects such as fires are rendered using a large number of two-dimensional elements, often referred to as 'billboards', each having a pre-defined shape. For example, a selection of four pre-defined shapes may be provided to assist with generating an appearance of non-uniformity. The elements are provided with a spawn location and a trajectory (and/or end location), and are able to vary their colour in accordance with their position. This can be used to simulate the effect of flames or the like, given a suitable selection of motion and colour constraints for the desired output.

For example, in a number of earlier arrangements a method of generating a representation of a fire includes defining a number of circular (or other shape) two-dimensional elements that are animated in line with a set of temporal rules. These temporal rules can define the velocity, acceleration, size, and/or colour of the elements over time. Specifically, in this example, the elements could be animated so as to begin white and large, and to move vertically with a specified deceleration while also becoming redder before disappearing entirely. In some cases, an element of randomness is introduced so as to reduce the appearance of uniformity.

In embodiments of the present disclosure, it is considered that the content generation process may be improved by replacing the use of the two-dimensional elements as discussed above. Instead, individually manipulable and deformable two- or three-dimensional elements are used. The use of elements that are able to be controlled on a smaller scale may be advantageous in generating a more realistic representation of an object.

In a number of embodiments, machine learning algorithms are used in order to derive an appropriate set of parameters for modifying and/or controlling these elements in the generated representations. While not essential, such approaches may be advantageous in that the representations may be generated with a higher quality and in a shorter time. For example, by utilising a machine learning algorithm it may be possible to provide a greater (and otherwise prohibitively large) number of elements that contribute to the representation; this can increase the level of detail that is able to be provided.

Such implementations, and particularly those that utilise three-dimensional elements, may also be more suited to three-dimensional representations of objects than traditional methods. One factor that may contribute to this is that of the ease with which it is possible to generate a view of the representation from other angles relative to existing methods—as is considered advantageous in free viewpoint applications, for example.

Figure 12:
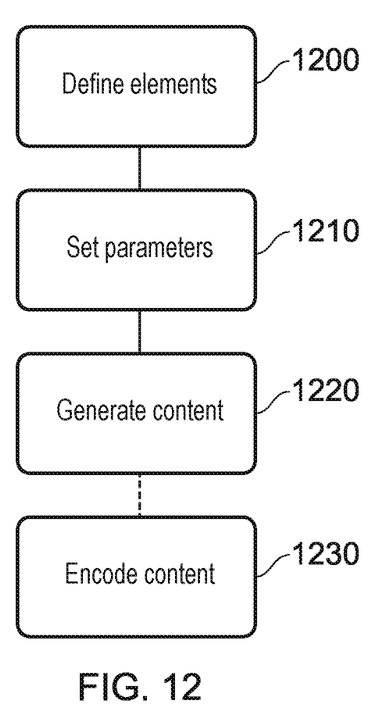
FIG. 12 schematically illustrates a content generation and encoding method.

FIG. 12 schematically illustrates a content generation method for generating content for display including one or more objects to be rendered.

A step 1200 comprises defining a plurality of virtual elements. As discussed above, these may be two- or three-dimensional objects with a predefined shape (for example, a circle or sphere) and size. The size or shape may be determined as appropriate for an application, and it is considered that these are not fixed throughout the lifetime of the element within the representation.

The number of elements may be selected freely for an application as appropriate; for example, for low-quality rendering or low-bandwidth transmission a smaller number (such as 100) of elements may be defined, while in a higher-quality rendering a larger number (such as 10,000) of elements may be defined.

While it is possible that each of the defined elements is unique, in some embodiments one or more particle types are defined with each of the defined elements belonging to one or more of these types. For example, a representation may comprise elements of two or more different types that have different characteristics. The different characteristics may relate to initial conditions (such as an initial element size and/or shape), as well as those aspects of an element that change over time (such as the motion and/or size of the element).

A step 1210 comprises setting one or more parameters associated with each of the plurality of virtual elements. These parameters should be determined so as to generate a desired visual effect; for example, simulating a real object using a virtual representation or creating a virtual object that is not related to a particular example of a real object. For example, the parameters may be set such that the virtual representation mimics an existing real-world waterfall, or they may be set so as to generate a representation of a generic fire that does not exist in the real world (although the parameters may be set in dependence upon information gathered from viewing real fires).

In some embodiments, setting the one or more parameters includes setting one or more parameters in accordance with the output of a machine learning algorithm adapted to determine appropriate parameters for the plurality of virtual elements so as to simulate an object to be rendered. The machine learning aspect of the relevant embodiments is discussed in more depth below, with reference to FIG. 14.

In some embodiments, these parameters relate to initial conditions for the elements and one or more rules that govern their evolution over time (such as motion and/or a change in the properties of the element, such as shape, opacity, colour, and lifespan). This may be in the form of absolute values assigned to the elements, or in terms of one or more time-dependent functions. Alternatively, or in addition, these parameters can describe or otherwise parametrise interactions between two or more elements and/or one or more elements and the local environment in which the representation is rendered.

A step 1220 comprises generating content for display using the plurality of virtual elements and corresponding parameter values. For example, this may comprise rendering image frames comprising the plurality of elements (in accordance with the parameters that have been set), and rendering additional frames that comprise those elements as they change and/or move over time in line with those parameters. This may be performed as a part of the rendering of an entire virtual scene, for example in a game or other virtual reality experience. Alternatively, or in addition, the generation may be performed in advance to generate a visual representation that can be encoded using standard video encoding techniques, such that the encoded video may be inserted into a generated scene as appropriate. Of course, any other suitable encoding may be applied to the generated content.

An optional step 1230 comprises encoding the generated content for transmission or storage. This encoding may be performed in any of a number of suitable manners, which may depend upon the intended use of the content.

For example, a representation of the generated content using one or more meshes and textures could be encoded. This may enable the content to be stored in an efficient manner that may be compatible with a range of legacy content decoders, as well as potentially enable an easier insertion of the generated content into other content representing a virtual scene in which the content appears.

For instance, a process may be performed that generates a mesh that approximates a surface that can be used to represent the content; an example of this is an identification of a plurality of surface elements (such as those which are only adjacent to elements in one direction, indicating that they are surface elements) and the generation of surface functions that describe the shape that is defined by those points. This may then be combined with a generation of texture information that represents the visual appearance of the content at that time.

Alternatively, or in addition, at least a subset of the one or more parameters may be encoded such that the generated content can be reconstructed from the encoded parameters. For example, given a base model to which the parameters may be applied it may be possible to entirely reconstruct the content based on a small number of parameters. For instance, by encoding a lifetime, velocity, acceleration, and colour, a suitable approximation of the generated content may be reproducible by another device.

As has been alluded to, reproductions of the generated content need not be identical to that which is originally created; the subject matter may be resilient to small changes. For example, the use of the mesh to represent the content may be suitable despite the loss of detail as it may produce a suitably high-quality approximation. Similarly, the transmission of parameters may also be suitable even where there is a random or stochastic element to the content generation (such as a random element spawn time, or random motion direction for each element)—the fact that the reconstruction is not identical may not be relevant. For example, when viewing a fire the emphasis is on it being realistic, rather than the component elements following specific patterns so as to perfectly replicate earlier content.

Figure 13:
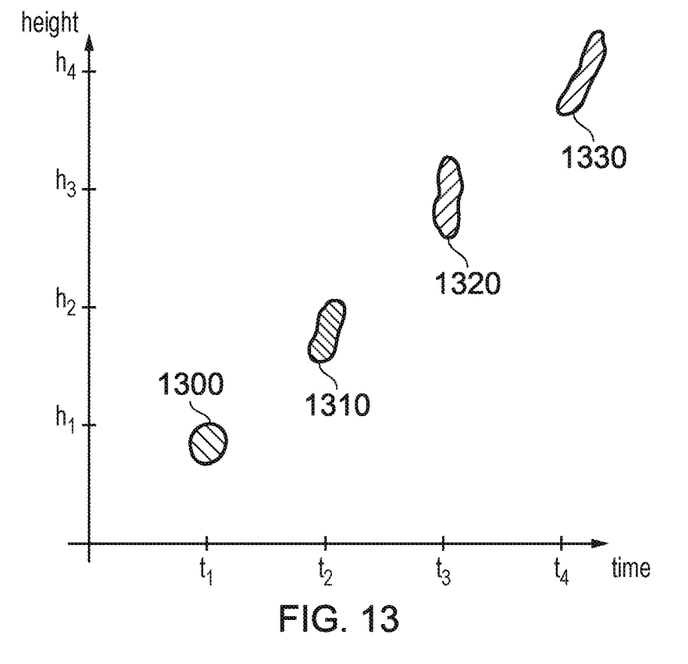
FIG. 13 schematically illustrates modification of element parameters.

FIG. 13 schematically illustrates an example of changing parameters of an element, and the resulting differences in the display of that element. The horizontal axis shows increasing time, while the vertical axis shows increasing height of an element. The elements 1300, 1310, 1320, 1330 represent the same element at respective times t1, t2, t3, t4. In this example, the elements are shown as being two-dimensional; however it should be considered that these elements may of course be three-dimensional in line with the present disclosure.

In the example of FIG. 13, parameters are set so as to cause the elements to move up (increase their height relative to a start point, with respect to a predefined coordinate system) while also changing colour (represented by variation in hatching) and becoming deformed. The different times $t_1$-$t_4$ may represent consecutive frames, for example, or any other suitable time intervals (such as 0.1 seconds, 0.5 seconds, or 1 second, or any other value). The separation between these time intervals is entirely illustrative, of course, and the parameters may not be defined with a linear set of time intervals at all. Similarly, the change in height (which is shown to occur with a constant velocity) may occur at any speed and with any acceleration—and of course, the motion may be three-dimensional but only height is shown for clarity in the present Figure.

Starting with the element 1300 (at time $t_1$), this is shown as a circular element with a dense up-left hatching with a height of $h_1$. The element 1310, shown at time $t_2$, shows a change in colour (represented by a less-dense up-left hatching relative to the element 1300) in addition to a more elongated shape and an increase in height to $h_2$. Element 1320, corresponding to time $t_3$, similarly shows a more elongated shape than the earlier elements. In addition to this, the colour has changed further (represented by the up-right hatching) and the height has increased to $h_3$. Finally, the element 1330, found at time $t_4$, shows a further elongation of the element. In addition to this, the height of the element has increased to $h_4$, while the colour has remained constant.

This Figure illustrates an example in which parameters are varied over time, but of course it is considered that any number of parameters may be changed in any combination, and over any interval of time. In some embodiments, different elements within the same model may have parameters that vary differently to other elements within that model. It is also considered that the parameters need not vary in dependence upon time—instead, the parameters may vary in dependence upon position, velocity, or lifetime, for example.

Figure 14:
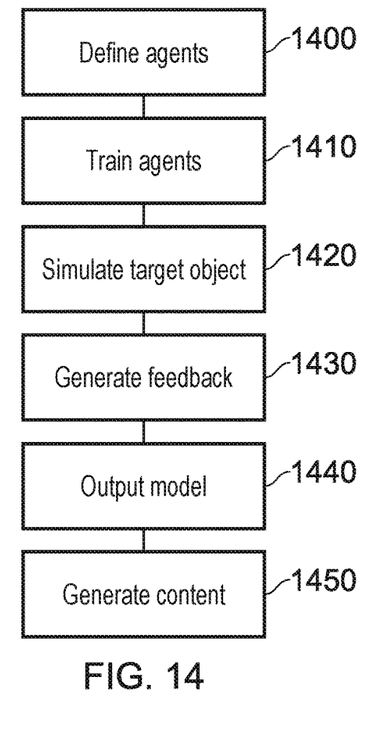
FIG. 14 schematically illustrates a machine learning method.

As discussed above, suitable embodiments of the present disclosure may utilise a machine learning model in generating content for display. FIG. 14 schematically illustrates an example of such a machine learning based method for generating content; this method is based upon reinforcement learning techniques, although other machine learning or artificial intelligence based methods may also be suitable.

At a step 1400 a plurality of reinforcement learning agents are defined. Each of these agents corresponds to a particle or other element within the content, such as the element 1300 in FIG. 13. These agents are defined so as to have one or more modifiable properties or parameters that may be varied in order to generate a suitable simulation of a target object. Examples of such properties include colour, velocity, size, shape, and/or acceleration; these may be defined as constant values, or the values may be determined by one or more specified functions that may be dependent upon time or position or the like.

In some examples two or more types or groups of agents/particles are defined; all agents in a particular group may have overlapping or otherwise corresponding characteristics. For example, in a simulation of an explosion it is considered that a first group of agents may correspond to the initial burst while a second group of agents may correspond to the debris or other matter.

Of course, the agents may be defined such that one or more of the parameters have a random component to their value. This may assist with modelling stochastic systems or for generalising the model to represent a general class of object or the like.

At a step 1410, an initial training process is performed. This may comprise the supply of video or still images of the target object, for example, to the model so as to determine suitable parameters for the defined agents. Of course, the training data may comprise data relating to more than one object—for example, data relating to several objects that all belong to the same group or class. For instance, rather than providing a video of a single fire, video content relating to a large number of fires may be provided.

At a step 1420, the trained agents are used to simulate the target object, for example by generating a representation of the object using the trained agents. This may be an attempt at directly reproducing the content that is provided in step 1410 using a parametrised representation of the system, or it may be a simulation of a generalised object that is similar to the target object/belongs to the same group/class as the objects shown in the training data.

At a step 1430, feedback characterising the representation generated in step 1420 is provided. This feedback may include a measure of the quality of the representation in simulating a particular target. After the feedback has been provided, the method may return to step 1410 in order to further refine the training of the agents in view of the generated feedback. Alternatively, if the representation is identified as being suitable (or an above-threshold number of representations has been identified as being suitable), the method may proceed to a step 1440.

In some examples, the feedback may be based upon a measure of the visual or perceptive loss between the simulated representation and any input training content or target object. This is effectively a measure of how well the representation appears to match the target object, and it may be computed for multiple viewpoints so as to relate to different aspects of the representation or may be determined in a view-independent manner.

At the step 1440, a trained model is output or otherwise stored. The model may include information identifying a number of agents/particles, corresponding groups, and initial parameters and/or information identifying the varying of the parameters with position and/or time.

At a step 1450, content is generated using the output model. This may be performed as part of an image rendering process, for example as a part of a simulation of a virtual environment which is displayed to a viewer.

This method is therefore able to convert videos of objects into parameters governing a set of particles and their motion in order to simulate those objects. This can enable the generation of a wider range of similar objects, as well as improved rendering (particularly with regards to the three-dimensional qualities of the objects). As noted above, the use of machine learning methods is not necessarily essential to achieve this effect; although they may be particularly well-suited.

Figure 15:
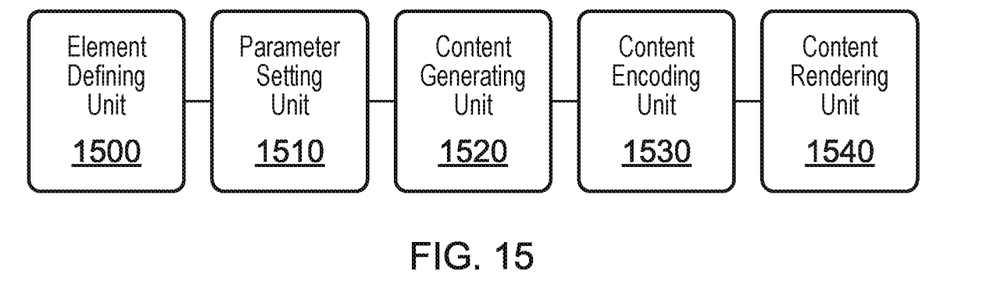
FIG. 15 schematically illustrates a content generation, encoding, and rendering apparatus.

FIG. 15 schematically illustrates a content generation system for generating content for display including one or more objects to be rendered. The system comprises an element defining unit 1500, a parameter setting unit 1510, a content generating unit 1520, a content encoding unit 1530, and a content rendering unit 1540.

The element defining unit 1500 is operable to define a plurality of virtual elements; in some embodiments the element defining unit 1500 is operable to define two or more groups into which elements with corresponding parameters are grouped. One or more of the elements may be three-dimensional shapes, while two-dimensional shapes may be preferred for at least a subset of the elements in a number of embodiments.

The parameter setting unit 1510 is operable to set one or more parameters associated with each of the plurality of virtual elements. The one or more parameters may include any one or more of the colour, position, velocity, opacity, lifetime, size, and/or deformation of the corresponding elements, or indeed any other suitable variable. In some embodiments the one or more parameters may relate to interactions, such as simulations of collisions or forces that act at a distance (such as electromagnetic repulsion), between two or more elements. The one or more parameters are represented as time-dependent functions in some embodiments; alternatively, or in addition, the parameters may be represented using position-dependent functions.

In some embodiments, the parameter setting unit 1510 is operable to set the one or more parameters in accordance with the output of a machine learning algorithm adapted to determine appropriate parameters for the plurality of virtual elements so as to simulate an object to be rendered. The machine learning algorithm may be a reinforcement learning algorithm, and in those embodiments each of the virtual elements is represented by a reinforcement learning agent. The algorithm may be trained using image and/or video content captured of one or more real objects, in some embodiments.

The content generating unit 1520 is operable to generate content for display using the plurality of virtual elements and corresponding parameter values. For example, this may comprise an encoding using one or more meshes and textures to represent a generated piece of content. Of course, any other suitable scheme for representing visual content may be used instead (or in addition) to this.

The content encoding unit 1530 is operable to encode a representation of the generated content. This representation may comprise any suitable information for reconstructing the model or reproducing generated content, such as parametrisation information and element information that can be used to implement the model to generate an output image. That is, the content encoding unit 1530 may be operable to encode at least a subset of the one or more parameters such that the generated content can be reconstructed from the encoded parameters.

The rendering unit 1540 is operable to render the generated content as a part of a virtual scene, for example, or as a standalone virtual element.

The arrangement of FIG. 15 may be considered an example of a processor (such as the CPU 1100 of FIG. 11) that is configured generate content for display including one or more objects to be rendered, and in particular is configured to:

define a plurality of virtual elements;

set one or more parameters associated with each of the plurality of virtual elements; and generate content for display using the plurality of virtual elements and corresponding parameter values, wherein the parameter setting unit is operable to set the one or more parameters in accordance with the output of a machine learning algorithm adapted to determine appropriate parameters for the plurality of virtual elements so as to simulate an object to be rendered.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A content generation system for generating content for display including one or more objects to be rendered, the system comprising:

an element defining unit operable to define a plurality of virtual elements that form a virtual object to be rendered;

a parameter setting unit operable to set one or more parameters associated with each of the plurality of virtual elements; and a content generating unit operable to generate content for display using the plurality of virtual elements and corresponding parameter values, wherein the parameter setting unit is operable to set the one or more parameters in accordance with the output of a machine learning algorithm adapted to determine appropriate parameters for the plurality of virtual elements so as to simulate an object to be rendered, and the machine learning algorithm is a reinforcement learning algorithm including a plurality of reinforcement learning agents, where the one or more parameters associated with each of the plurality of virtual elements are set by a respective one of the plurality of reinforcement learning agents.

2. The system of claim 1, wherein:

the machine learning algorithm is trained using image and/or video content captured of one or more real objects.

3. The system of claim 1, wherein the element defining unit is operable to define two or more groups into which virtual elements with corresponding parameters are grouped.

4. The system of claim 1, wherein one or more of the virtual elements are three-dimensional shapes.

5. The system of claim 1, wherein the one or more parameters relate to interactions between two or more virtual elements.

6. The system of claim 5, wherein the interactions are collisions between virtual elements.

7. The system of claim 1, wherein the one or more parameters includes one or more of a colour, position, velocity, opacity, lifetime, size, and/or deformation of the corresponding virtual elements.

8. The system of claim 7, wherein the one or more parameters are represented as time-dependent functions.

9. The system of claim 1, wherein the content generating unit is operable to encode a representation of the generated content using one or more meshes and textures.

10. The system of claim 1, comprising a content encoding unit operable to encode at least a subset of the one or more parameters such that the generated content can be reconstructed from the encoded parameters.

11. The system of claim 1, comprising a rendering unit operable to render the generated content as a part of a virtual scene.

12. A content generation method for generating content for display including one or more objects to be rendered, the method comprising:

defining a plurality of virtual elements that form a virtual object to be rendered;

setting one or more parameters associated with each of the plurality of virtual elements; and generating content for display using the plurality of virtual elements and corresponding parameter values, wherein setting the one or more parameters includes setting one or more parameters in accordance with the output of a machine learning algorithm adapted to determine appropriate parameters for the plurality of virtual elements so as to simulate an object to be rendered, and the machine learning algorithm is a reinforcement learning algorithm including a plurality of reinforcement learning agents, where the one or more parameters associated with each of the plurality of virtual elements are set by a respective one of the plurality of reinforcement learning agents.

13. A non-transitory machine-readable storage medium which stores computer software which, when executed by a computer, causes the computer to perform a method for generating content for display including one or more objects to be rendered, the method comprising:

defining a plurality of virtual elements that form a virtual object to be rendered;

setting one or more parameters associated with each of the plurality of virtual elements; and generating content for display using the plurality of virtual elements and corresponding parameter values, wherein setting the one or more parameters includes setting one or more parameters in accordance with the output of a machine learning algorithm adapted to determine appropriate parameters for the plurality of virtual elements so as to simulate an object to be rendered, and the machine learning algorithm is a reinforcement learning algorithm including a plurality of reinforcement learning agents, where the one or more parameters associated with each of the plurality of virtual elements are set by a respective one of the plurality of reinforcement learning agents.

* * * * *